United States Patent
Shimizu et al.

(10) Patent No.: US 10,588,067 B2
(45) Date of Patent: Mar. 10, 2020

(54) TERMINAL APPARATUS, COMMUNICATION SYSTEM, AND CONNECTION-DESTINATION SELECTION METHOD

(71) Applicant: PANASONIC CORPORATION, Osaka (JP)

(72) Inventors: Noriyuki Shimizu, Kanagawa (JP); Hiroaki Asano, Kanagawa (JP); Yasufumi Ichikawa, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 16/066,011

(22) PCT Filed: Feb. 17, 2016

(86) PCT No.: PCT/JP2016/000822
§ 371 (c)(1),
(2) Date: Jun. 25, 2018

(87) PCT Pub. No.: WO2017/115451
PCT Pub. Date: Jul. 6, 2017

(65) Prior Publication Data
US 2019/0021036 A1 Jan. 17, 2019

(30) Foreign Application Priority Data

Dec. 28, 2015 (JP) ................... 2015-256827

(51) Int. Cl.
*H04W 36/26* (2009.01)
*H04W 36/00* (2009.01)
(Continued)

(52) U.S. Cl.
CPC ........ *H04W 36/26* (2013.01); *H04W 36/0011* (2013.01); *H04W 36/0061* (2013.01);
(Continued)

(58) Field of Classification Search
CPC ............. H04W 36/26; H04W 36/0011; H04W 36/0061; H04W 36/0083; H04W 36/08;
(Continued)

(56) References Cited

U.S. PATENT DOCUMENTS 9,398,508 B1 * 7/2016 Velusamy ......... H04W 36/0061
2009/0232096 A1 9/2009 Taniuchi
(Continued)

FOREIGN PATENT DOCUMENTS

JP 2002-135824 A 5/2002
JP 2009-218929 A 9/2009
(Continued)

OTHER PUBLICATIONS

English translation of JP 2012-114854 A provided by Applicant (Year: 2012).*
(Continued)

*Primary Examiner* — Ian N Moore
*Assistant Examiner* — Brian T Le
(74) *Attorney, Agent, or Firm* — Greenblum & Bernstein, P.L.C.

(57) ABSTRACT

To allow for selection of a connection-destination suitable for an application when switching from one connection-destination to another, or adding or deleting a connection-destination, a base station apparatus is configured to generate connection-destination candidate information on base station apparatuses as connection-destination candidates connectable to a terminal apparatus, and transmit to the terminal apparatus a connection-destination candidate notification control message including the connection-destination candidate information, and the terminal apparatus selects a new base station apparatus to be used as a new connection-destination based on the connection-destination candidate information and a communication condition (Continued)

required by a user application section, the user application section being configured to perform information processing required by a user concurrently with performing wireless communication.

4 Claims, 10 Drawing Sheets

(51) Int. Cl.
  *H04W 36/36* (2009.01)
  *H04W 76/27* (2018.01)
  *H04W 76/10* (2018.01)
  *H04W 36/08* (2009.01)
  *H04W 72/04* (2009.01)
  *H04W 72/06* (2009.01)
  *H04W 72/08* (2009.01)
  *H04W 80/02* (2009.01)
  *H04W 80/06* (2009.01)
  *H04W 80/08* (2009.01)

(52) U.S. Cl.
  CPC ....... *H04W 36/0083* (2013.01); *H04W 36/08* (2013.01); *H04W 36/36* (2013.01); *H04W 72/0486* (2013.01); *H04W 72/06* (2013.01); *H04W 72/08* (2013.01); *H04W 76/10* (2018.02); *H04W 76/27* (2018.02); *H04W 80/02* (2013.01); *H04W 80/06* (2013.01); *H04W 80/08* (2013.01)

(58) Field of Classification Search
  CPC ..... H04W 36/36; H04W 76/27; H04W 76/10; H04W 72/0486; H04W 72/06; H04W 72/08; H04W 80/02; H04W 80/06; H04W 80/08
  See application file for complete search history.

(56) References Cited

U.S. PATENT DOCUMENTS

| 2010/0128698 A1 | 5/2010 | Ishizu et al. |
| 2010/0172329 A1 | 7/2010 | Yokoyama et al. |
| 2014/0219119 A1 | 8/2014 | Ishida et al. |

FOREIGN PATENT DOCUMENTS

| JP | 2010-124374 A | 6/2010 |
| JP | 4992977 B2 | 5/2012 |
| JP | 2012-114854 A | 6/2012 |
| WO | 2013/031114 A1 | 3/2015 |
| WO | 2015/087042 A1 | 6/2015 |
| WO | 2015/104839 A1 | 7/2015 |

OTHER PUBLICATIONS

Official Communication issued in International Pat. Appl. No. PCT/JP2016/000822, dated May 10, 2016.

* cited by examiner

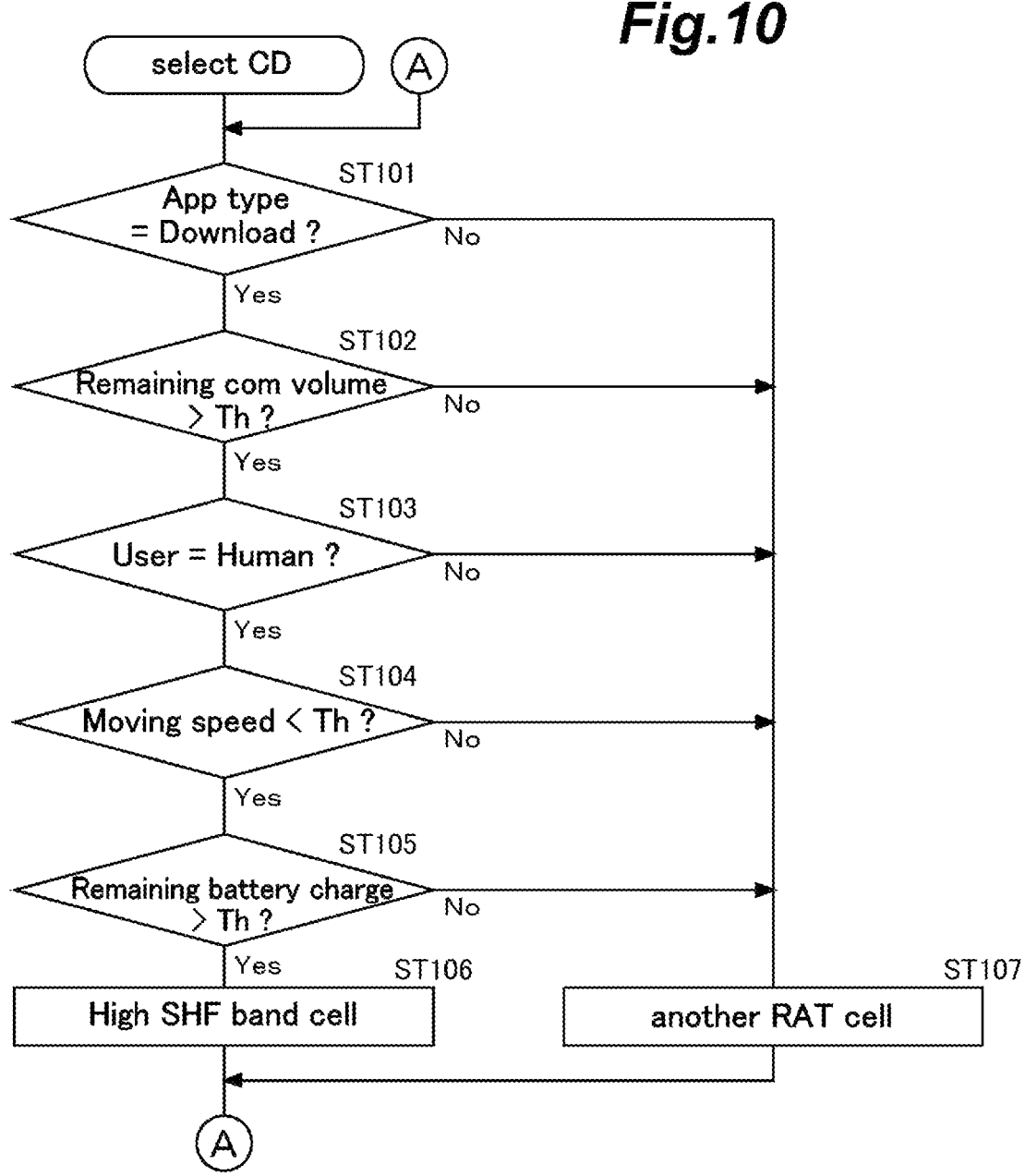

TERMINAL APPARATUS, COMMUNICATION SYSTEM, AND CONNECTION-DESTINATION SELECTION METHOD

TECHNICAL FIELD

The present invention relates to a communication system comprising a terminal apparatus and a plurality of base station apparatuses, wherein the terminal apparatus is configured to select a base station apparatus to be used as a connection-destination from the plurality of base station apparatuses, and perform wireless communication with the selected base station apparatus, and a connection-destination selection method for selecting a base station apparatus to be used as a connection-destination from a plurality of base station apparatuses.

BACKGROUND ART

In recent years, the widespread use of wireless communication systems supporting various RATs (Radio Access Technologies), such as mobile phone communication networks (e.g. LTE (Long Term Evolution)) and wireless LANs, allows terminal apparatuses, such as smartphones, to select a base station supporting any of various RATs as necessity. In the future, 5G (a next generation mobile communication system) will be added to the systems to be used, which will expand a range of choices of wireless communication systems. In a communication environment in which multiple wireless communication systems coexist such as what is called a heterogeneous network, each terminal has many connectable base stations and thus is required to properly select a base station to be used as a connection-destination.

Meanwhile, various types of applications are running on each terminal apparatus. Examples of such applications include applications for downloading data, applications for real-time systems (e.g. applications for voice call and/or video distribution), and applications for non-real-time systems (e.g. applications for e-mailing). Since required communication conditions (e.g. communication qualities) vary depending on the type of application, it is necessary to select a base station to be used as a connection-destination according to an application(s) which requires wireless communication.

An example of known technology for selecting a base station to be used as a connection-destination according to an application(s) which requires wireless communication is a network connection system capable of properly selecting a base station to be used as a connection-destination depending on the type of application (e.g. mailer, network browser) to be used (See Patent Document 1), and another example of known technology is a network connection system capable of selecting a communication system depending on the type of data service (e.g., voice call, electronic mail transmission, file downloading) to be used by a terminal apparatus (See Patent Document 2).

PRIOR ART DOCUMENT(S)

Patent Document(s)

Patent Document 1: JP2002-135824A
Patent Document 2: JP4992977B

SUMMARY OF THE INVENTION

Task To Be Accomplished by the Invention

However, Patent Document 1 listed as a prior art document teaches that a connection-destination is selected based on a required communication condition, which varies depending on the type of application or the like, when a terminal apparatus which has not yet been used for communication selects an initial connection-destination to start communication, and fails to teach how a terminal apparatus can switch from one connection-destination to another, or add or delete a connection-destination(s) concurrently with performing communication with a base station.

Patent Document 2 listed as another prior art document teaches choosing a communication system (or a RAT) based on the type of data services; that is, Patent Document 2 teaches how to choose a communication system (or a RAT), but does not teach how to select a base station to be used as a specific connection-destination. Thus, the prior art technology cannot satisfy a need to select a base station suitable for an application.

The present invention has been made in view of such problems of the prior art, and a primary object of the present invention is to provide a terminal apparatus, a communication system and a connection-destination selection method which are configured to enable selection of a connection-destination suitable for an application when switching from one connection-destination to another, or adding or deleting a connection-destination(s).

Means to Accomplish the Task

A terminal apparatus according to the present invention is configured to select a base station apparatus to be used as a connection-destination from a plurality of base station apparatuses and perform wireless communication with the base station apparatus, and comprises:

a communicator configured to perform wireless communication with one or more of the base station apparatuses;

a controller comprising a user application section, the user application section being configured to perform information processing required by a user concurrently with performing wireless communication via the communicator with one or more of the base station apparatuses;

wherein the communicator is configured to receive a connection-destination candidate notification control message (CDC notification control message) transmitted from a base station apparatus, the CDC notification control message including connection-destination candidate information (CDC information) on base station apparatuses as connection-destination candidates (CDCs) connectable to the terminal apparatus, and wherein the controller is configured to select a new base station apparatus to be used as a new connection-destination based on a communication condition required by the user application section and the CDC information.

A communication system according to the present invention comprises a terminal apparatus and a plurality of base station apparatuses, wherein the terminal apparatus is configured to select a base station apparatus to be used as a connection-destination from the plurality of base station apparatuses, and perform wireless communication with the selected base station apparatus, wherein a base station apparatus comprises:

a base station communicator configured to perform wireless communication with the terminal apparatus; and a base station controller configured to generate connection-destination candidate information (CDC information) on base station apparatuses as connection-destination candidates (CDCs) connectable to the terminal apparatus;

wherein the base station communicator is configured to transmit a connection-destination candidate notification control message (CDC notification control message) to the terminal apparatus, the CDC notification control message including the CDC information, wherein the terminal apparatus comprises:

a terminal apparatus communicator configured to perform wireless communication with one or more of the base station apparatuses; and a terminal apparatus controller comprising a user application section, the user application section being configured to perform information processing required by a user concurrently with performing wireless communication via the terminal apparatus communicator with one or more of the base station apparatuses, wherein the terminal apparatus communicator is configured to receive the CDC notification control message transmitted from a base station apparatus, and wherein the terminal apparatus controller is configured to select a new base station apparatus to be used as a new connection-destination based on a communication condition required by the user application section and the CDC information.

A connection-destination selection method for selecting a base station apparatus to be used as a connection-destination from a plurality of base station apparatuses according to the present invention comprises:

the terminal apparatus receiving a connection-destination candidate notification control message (CDC notification control message) transmitted from a base station apparatus, the CDC notification control message including connection-destination candidate information (CDC information) on base station apparatuses as connection-destination candidates (CDCs) connectable to the terminal apparatus; and the terminal apparatus selecting a new base station apparatus to be used as a new connection-destination based on a communication condition required by the user application section and the CDC information.

Effect of the Invention

The present invention enables the terminal apparatus to select, from base station apparatuses listed in a base station apparatus as connection-destination candidates, a new base station apparatus to be used as a new connection-destination such that the new base station apparatus meets a communication condition required by a user application section. As a result, the terminal apparatus which is already being used for communication with a base station apparatus can, concurrently with performing wireless communication with the base station apparatus, select a connection-destination suitable for a user application section when switching from one connection-destination to another, or adding or deleting a connection-destination(s).

BRIEF DESCRIPTION OF THE DRAWINGS

FIG. 10 is a flow diagram showing an example of processing performed by a connection-destination selector 43 of the terminal apparatus 1.

DESCRIPTION OF THE PREFERRED EMBODIMENT(S)

Figure 1:
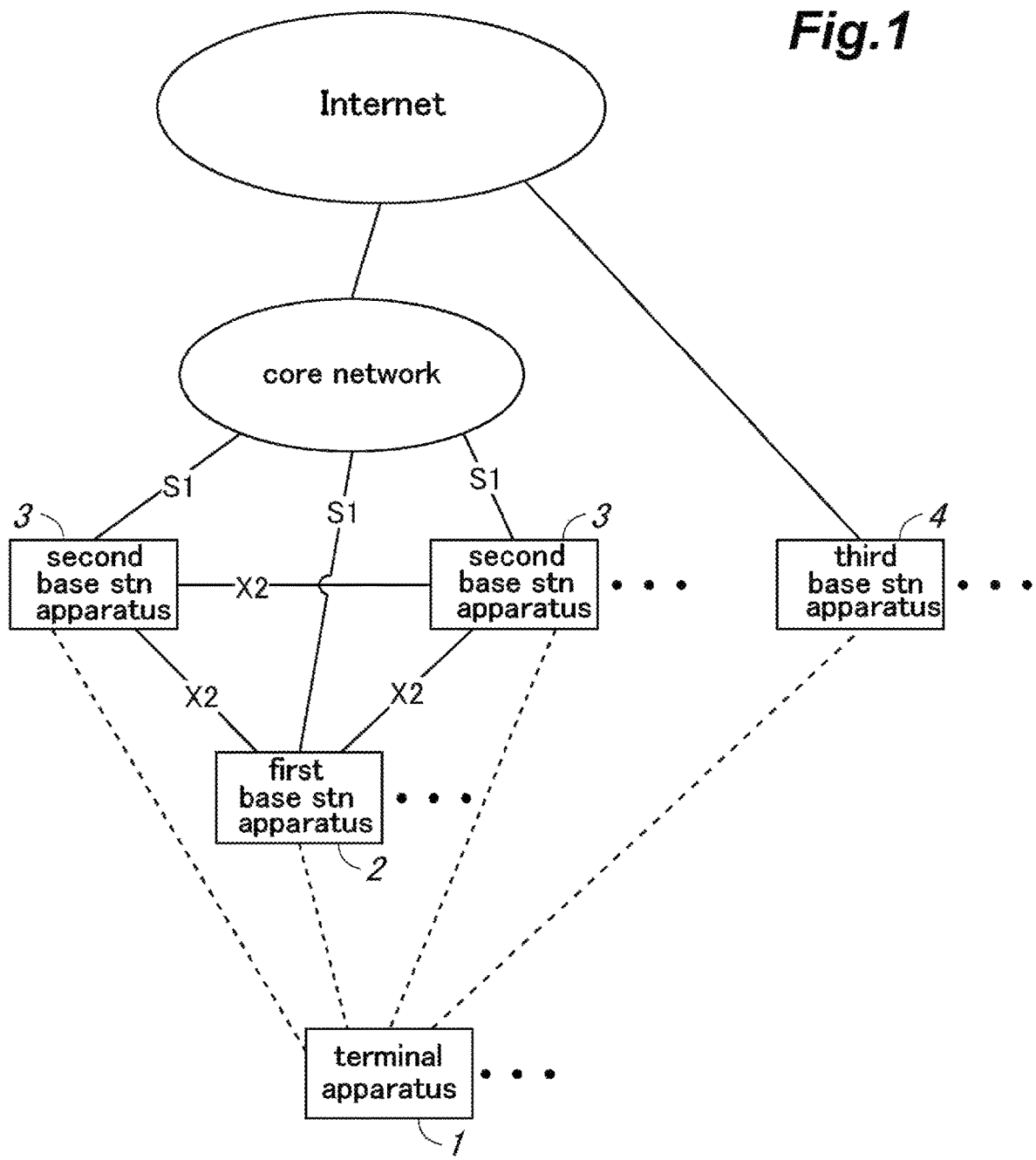
FIG. 1 is a general configuration diagram of a communication system according to the present invention.

A first aspect of the present invention made to achieve the object thereof is a terminal apparatus configured to select a base station apparatus to be used as a connection-destination from a plurality of base station apparatuses and perform wireless communication with the base station apparatus, comprising:

a communicator configured to perform wireless communication with one or more of the base station apparatuses;

a controller comprising a user application section, the user application section being configured to perform information processing required by a user concurrently with performing wireless communication via the communicator with one or more of the base station apparatuses;

wherein the communicator is configured to receive a connection-destination candidate notification control message (CDC notification control message) transmitted from a base station apparatus, the CDC notification control message including connection-destination candidate information (CDC information) on base station apparatuses as connection-destination candidates (CDCs) connectable to the terminal apparatus, and wherein the controller is configured to select a new base station apparatus to be used as a new connection-destination based on a communication condition required by the user application section and the CDC information.

This configuration enables the terminal apparatus to select, from base station apparatuses listed in a base station apparatus as connection-destination candidates, a new base station apparatus to be used as a new connection-destination such that the new base station apparatus meets a communication condition required by a user application section. As a result, the terminal apparatus which is already being used for communication with a base station apparatus can, concurrently with performing wireless communication with the base station apparatus, select a connection-destination suitable for a user application section when switching from one connection-destination to another, or adding or deleting a connection-destination(s).

A second aspect of the present invention is the terminal apparatus of the first aspect, wherein the user application section is configured to select the new base station apparatus to be used as the new connection-destination based on the CDC information and the communication condition required by the user application section.

This configuration enables the terminal apparatus to perform connection-destination selection processing a proper manner since the user application section which requires to communicate with the connection-destination itself selects a base station apparatus to be used as a new connection-destination.

A third aspect of the present invention is the terminal apparatus of the first aspect, wherein the controller comprises a monitoring application section, the monitoring application section being configured to monitor the user application section, and wherein the monitoring application section is configured to select the new base station apparatus based on the CDC information and the communication condition required by the user application section.

This configuration enables the terminal apparatus to perform connection-destination selection processing in a proper manner since the monitoring application section selects a base station apparatus to be used as a new connection-destination.

A fourth aspect of the present invention is the terminal apparatus of the first aspect, wherein as the communication condition, a communication condition of any one of a user application section running in foreground, a user application section having a highest priority level, and a user application section having a largest communication volume per a specific time period is defined, wherein the user application section is included in a plurality of user application sections running on the terminal apparatus.

This configuration enables the terminal apparatus to select a base station apparatus to be used as a new connection-destination in a proper manner.

A fifth aspect of the present invention is the terminal apparatus of the first aspect, wherein the communicator is configured to transmit a connection-destination candidate request control message (CDC request control message) to the base station apparatus wherein the CDC request control message is configured to request the base station apparatus to provide the CDC information to the terminal apparatus, and the communicator is further configured to receive the CDC notification control message transmitted from the base station apparatus in response to the CDC request control message.

This configuration enables the terminal apparatus to receive a CDC notification control message at the right time.

A sixth aspect of the present invention is the terminal apparatus of the fifth aspect, wherein the controller is configured to determine whether or not the base station apparatus currently being used for communication meets the communication condition required by the user application section, and wherein the communicator is configured not to transmit the CDC request control message to the base station apparatus when the controller determines that the base station apparatus meets the communication condition.

This configuration enables the terminal apparatus to avoid performing unnecessary processing.

A seventh aspect of the present invention is the terminal apparatus of the sixth aspect, wherein the controller is configured to determine whether or not the base station apparatus currently being used for communication meets the communication condition when the terminal apparatus transits from a non-communication state to a communication state or when the user application section whose communication condition is defined as the communication condition is changed to another user application section.

This configuration enables the terminal apparatus to determine whether or not a communication condition is met at the right time.

An eighth aspect of the present invention is the terminal apparatus of the fifth aspect, wherein the communicator is configured to add information on results of measurements of wireless communication qualities associated with base station apparatuses detected by the terminal apparatus to the CDC request control message to produce a measurement result report control message, and transmit the measurement result report control message to the base station apparatus.

This configuration enables the base station apparatus to generate proper CDC information since the base station apparatus can determine whether or not the communication quality requirements are met based on information on results of measurements of wireless communication qualities. In a similar configuration, the terminal apparatus may transmit a measurement result report control message including information on results of measurements of wireless communication qualities separately from the transmission of a CDC request control message.

A ninth aspect of the present invention is the terminal apparatus of the first aspect, wherein the CDC notification control message comprises information on levels of congestion associated with the CDCs, and wherein the controller is configured to select the new base station apparatus based on the information on levels of congestion.

This configuration enables the terminal apparatus to select a base station apparatus to be used as a new connection-destination in a proper manner.

A tenth aspect of the present invention is the terminal apparatus of the first aspect, wherein the communicator is configured to transmit a connection-destination switch request control message (CD switch request control message) to the base station apparatus when the connection destination is switched from the base station apparatus currently being used for communication to the new connection-destination, the CD switch request control message including identification information on the new base station apparatus selected by the controller as the new connection-destination.

This configuration enables the terminal apparatus to properly request a base station apparatus to add another base station apparatus to be used for a new connection-destination selected by the terminal apparatus.

An eleventh aspect of the present invention is the terminal apparatus of the first aspect, wherein the communicator transmits a connection-destination addition request control message (CD addition request control message) to the base station apparatus when the new connection-destination is required to be used in addition to the base station apparatus currently being used for communication, the CD addition request control message including identification information on the new base station apparatus selected by the controller as the new connection-destination.

This configuration enables the terminal apparatus to properly request the base station apparatus to switch the connection-destination from the base station apparatus to a new base station apparatus to be used for a new connection-destination selected by the terminal apparatus.

A twelfth aspect of the present invention is the terminal apparatus of the tenth or eleventh aspect, wherein the communicator is configured to add information on results of measurements of wireless communication qualities associated with the new base station apparatus selected by the controller as the new connection-destination to the CD switch request control message or the CD addition request control message, and transmit the CD switch request control message or the CD addition request control message with the added information on results of measurements to the base station apparatus.

This configuration enables the base station apparatus to decide a suitable base station apparatus to be used as a connection-destination since the base station apparatus can determine whether or not the communication quality requirements are met based on information on results of measurements of wireless communication qualities.

A thirteenth aspect of the present invention is the terminal apparatus of the first aspect, wherein the controller is configured to make a necessity examination of the base station apparatus currently being used for communication to determine whether or not the base station apparatus is necessary as a connection-destination, and is configured to decide to delete the base station apparatus from the base station apparatuses to be used as connection-destinations when the controller determines that the base station apparatus is not necessary, and wherein the communicator is configured to transmit a connection-destination deletion request control message (CD deletion request control message) to the base station apparatus, the CD deletion request control message including identification information on the base station apparatus which the controller has decided to delete.

This configuration enables deletion of an unnecessary connection-destination(s).

A fourteenth aspect of the present invention is the terminal apparatus of the thirteenth aspect, wherein the controller is configured to make the necessity examination of the base station apparatus when the user application section whose communication condition is defined as the communication condition stops running or when a base station apparatus is newly detected.

This configuration enables the terminal apparatus to select a base station apparatus to be used as a new connection-destination at the right time.

A fifteenth aspect of the present invention is the terminal apparatus of the first aspect, wherein the controller is configured to select the new base station based on at least one of information on a type of the user application section, information on a state of the user application section, information on a type of a user of the user application section, information on a state of a user of the user application section, and information on a state of the terminal apparatus.

This configuration enables the terminal apparatus to select a base station apparatus to be used as a new connection-destination in a proper manner.

A sixteenth aspect of the present invention is the terminal apparatus of the first aspect, wherein the communicator is configured to make a change in connection-destination according to any of the control messages at any one of MAC (Media Access Control) layer, PDCP (Packet Data Convergence Protocol) layer, and TCP (Transmission Control Protocol) layer.

This configuration enables the terminal apparatus to properly make a change in connection-destination (addition, switch, or deletion).

A seventh aspect of the present invention is the terminal apparatus of the first aspect, wherein the communicator is configured to transmit and receive the control message at RRC (Radio Resource. Control) layer when a change in connection-destination is made.

This enables the terminal apparatus to transmit and receive control messages when a change in connection-destination (addition, switch, or deletion) is made.

A eighteenth aspect of the present invention is a communication system comprising a terminal apparatus and a plurality of base station apparatuses, wherein the terminal apparatus is configured to select a base station apparatus to be used as a connection-destination from the plurality of base station apparatuses, and perform wireless communication with the selected base station apparatus, wherein a base station apparatus comprises:

a base station communicator configured to perform wireless communication with the terminal apparatus; and a base station controller configured to generate connection-destination candidate information (CDC information) on base station apparatuses as connection-destination candidates (CDCs) connectable to the terminal apparatus;

wherein the base station communicator is configured to transmit a connection-destination candidate notification control message (CDC notification control message) to the terminal apparatus, the CDC notification control message including the CDC information, wherein the terminal apparatus comprises:

a terminal apparatus communicator configured to perform wireless communication with one or more of the base station apparatuses; and a terminal apparatus controller comprising a user application section, the user application section being configured to perform information processing required by a user concurrently with performing wireless communication via the terminal apparatus communicator with one or more of the base station apparatuses, wherein the terminal apparatus communicator is configured to receive the CDC notification control message transmitted from a base station apparatus, and wherein the terminal apparatus controller is configured to select a new base station apparatus to be used as a new connection-destination based on a communication condition required by the user application section and the CDC information.

This configuration enables the terminal apparatus in the system to select a connection-destination suitable for a user application section when switching from one connection-destination to another, or adding or deleting a connection-destination(s) in a similar manner to the first aspect.

A nineteenth aspect of the present invention is a connection-destination selection method for selecting a base station apparatus to be used as a connection-destination from a plurality of base station apparatuses, wherein the method comprising:

the terminal apparatus receiving a connection-destination candidate notification control message (CDC notification control message) transmitted from a base station apparatus, the CDC notification control message including connection-destination candidate information (CDC information) on base station apparatuses as connection-destination candidates (CDCs) connectable to the terminal apparatus; and the terminal apparatus selecting a new base station apparatus to be used as a new connection-destination based on a communication condition required by the user application section and the CDC information.

This method enables selection of a connection-destination suitable for a user application section when switching from one connection-destination to another, or adding or deleting a connection-destination(s) in a similar manner to the first aspect.

Embodiments of the present invention are described in the following with reference to the appended drawings.

FIG. 1 is a general configuration diagram of a communication system according to an embodiment of the present invention.

The communication system includes a terminal apparatus 1, a first base station apparatus 2 which performs wireless communication with the terminal apparatus 1, second base station apparatuses 3, and one or more third base station apparatus 4. The communication system is what is called a heterogeneous network, in which the first base station apparatus 2, the second base station apparatuses 3, and the third base station apparatuses 4 support respective different RATs (Radio Access Technologies).

The terminal apparatus 1 is a smart phone, a tablet terminal or other such devices and is capable of communicating with the base station apparatuses 2 to 4, out of which a proper connection-destination(s) is selected so that the terminal apparatus 1 can perform communication with the selected base station apparatus(es).

The first base station apparatus 2 supports a RAT for mobile phones to perform wireless communication using a UHF band (frequencies from 300 MHz to 3 GHz) such as LTE. The first base station apparatus may be used as a macro cell base station having a cell radius of about 1 to 25 km, for example. The first base station apparatus 2 may be a control plane (C-Plane) base station used for transmitting control signals.

The second base station apparatuses 3 support a RAT for mobile phones to perform wireless communication using a high SHF band (frequencies from 6 GHz to 30 GHz) or an EHF band (mainly used frequencies from 30 GHz to 60 GHz). The second base station apparatus may be used as a small cell base station having a cell radius of about 10 m to 3 km, for example. Each second base station apparatus 3 may be a user plane (U-Plane) base station used for transmitting user data.

The multiple second base station apparatuses 3 are deployed in the communication area of the first base station apparatus 2, and thus the communication area of each second base station apparatus 3 overlaps with that of the first base station apparatus 2. The terminal apparatus 1 can use both the first base station apparatus 2 and a second base station apparatus 3 at the same time and further can use two or more second base station apparatuses 3 at the same time.

The first base station apparatus 2 and each second base station apparatus 3 are connected to each other via an X2 interface. The first base station apparatus 2 and each second base station apparatus 3 exchange control messages with each other and perform switch processing for switching from one connection-destination of the terminal apparatus 1 to another, or addition or deletion processing for adding or deleting a connection-destination(s) of the terminal apparatus 1. The first base station apparatus 2 and each second base station apparatus 3 are connected to the Internet via an Si interface and a higher core-network (higher communication network).

The third base station apparatuses 4 support a RAT other than those for mobile phones (as supported by the first and second base station apparatuses 2 and 3) such as RATs for a wireless LAN including WiFi (Registered Trademark) and WiGig (Registered Trademark) to perform wireless communication with the terminal apparatus 1. Moreover, the third base station apparatuses 4 are connected to the Internet.

Figure 2:
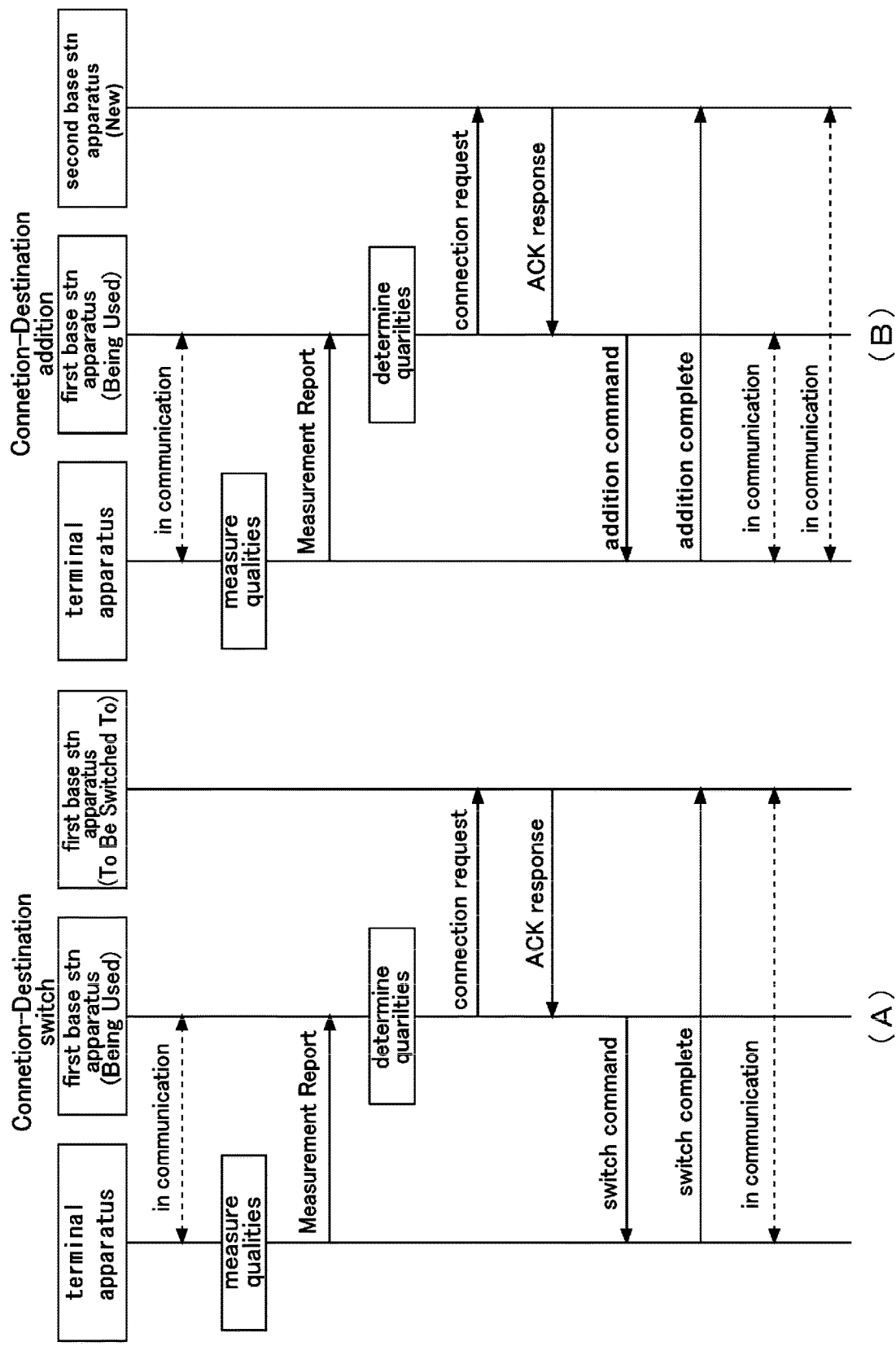
FIG. 2 is a sequence diagram showing basic processing procedures performed by a terminal apparatus 1, first base station apparatuses 2 and a second base station apparatus 3.

Next, basic procedures which the terminal apparatus 1, the first base station apparatus 2 and each second base station apparatus 3 perform will be described. FIG. 2 is a sequence diagram showing basic processing procedures performed by the terminal apparatus 1, the first base station apparatuses 2 and a second base station apparatus 3.

FIG. 2(A) shows an example of a procedure for switching from a first base station apparatus 2 currently being used for communication to another base station apparatus 2 to be used as a new connection-destination. In FIG. 2, the first base station apparatus 2 currently being used for communication is indicated as "First Base Stn Apparatus (Being Used)" and the first base station apparatus 2 to be used as the new connection-destination is indicated as "First Base Stn Apparatus (To Be Switched To)."

First, a transmission controller of the terminal apparatus 1 measures wireless communication qualities associated with a detected first base station apparatus 2 (to be switched to), and transmits a measurement result report control message (Measurement Report) including wireless communication quality measurements (e.g. received power, signal-noise ratio) to the first base station apparatus 2 currently being used for communication.

The first base station apparatus 2 currently being used for communication receives the measurement result report control message transmitted by the terminal apparatus 1 and determines whether or not the communication quality requirements are met based on the wireless communication quality measurements in the measurement result report control message to thereby determine the first base station apparatus 2 to be switched to. Then, the first base station apparatus 2 currently being used for communication transmits a connection request control message (e.g. Handover Request) to the first base station apparatus 2 to be switched to.

Upon receiving the connection request control message transmitted from the first base station apparatus 2 currently being used for communication, the first base station apparatus 2 (to be switched to) transmits an acknowledgement response control message (e.g. Handover Request ACK) back to the first base station apparatus 2 currently being used for communication.

Upon receiving the acknowledgement response control message transmitted from the first base station apparatus 2 to be switched to, the first base station apparatus 2 currently being used for communication transmits a switch command control message (e.g. Mobility from EUTRA command) transmits to the terminal apparatus 1.

Upon receiving the switch command control message transmitted from the first base station apparatus 2 currently being used for communication, the terminal apparatus 1 performs connection-destination switch processing (CD switch processing) and transmits a switch complete control message (e.g. Handover Complete) to the first base station apparatus 2 to be switched to. As a result, the terminal apparatus 1 becomes possible to start performing communication with the first base station apparatus 2 to which the connection-destination has been switched.

FIG. 2(B) shows an example of a procedure for adding a second base station apparatus 3 as a new connection destination in addition to the first base station apparatus 2 currently being used for communication.

First, the transmission controller of the terminal apparatus 1 measures wireless communication qualities associated with a detected second base station apparatus 3, and transmits a measurement result report control message (Measurement Report) including wireless communication quality measurements (e.g. received power, signal-noise ratio) to the first base station apparatus 2 currently being used for communication.

Upon receiving the measurement result report control message transmitted by the terminal apparatus 1, the first base station apparatus 2 currently being used for communication determines whether or not the communication quality requirements are met based on the wireless communication quality measurements in the measurement result report control message to thereby determine whether or not the detected second base station apparatus 3 is to be added. Then, the first base station apparatus 2 currently being used for communication transmits a connection request control message (e.g. SCG Addition Indication) to the second base station apparatus 3 to be added.

Upon receiving the connection request control message transmitted from the first base station apparatus 2 currently being used for communication, the second base station apparatus 3 to be added transmits an acknowledgement response control message (e.g. SCG Addition/Modification Request) back to the first base station apparatus 2 currently being used for communication.

Upon receiving the acknowledgement response control message transmitted from the second base station apparatus 3 to be added, the first base station apparatus 2 currently being used for communication transmits an addition command control message (e.g. RRC Connection Reconfiguration) to the terminal apparatus 1.

Upon receiving the addition command control message transmitted from the first base station apparatus 2 currently being used for communication, the terminal apparatus 1 performs connection addition processing (CD addition processing) as described later and transmits an addition complete control message (e.g. RRC Connection Reconfiguration Complete) to the second base station apparatus 3 to be added. As a result, the terminal apparatus 1 becomes possible to start performing communication with the added second base station apparatus 3 in addition to the first base station apparatus 2 currently being used for communication.

In the present embodiment, a connection-destination control program, which is configured to select a connection-destination through exchanging control messages with the first base station apparatus 2, is incorporated in each user application program. Executing the user application program on a processor implements user application sections, and among the implemented user application sections, a user application section configured to determine a communication condition for the terminal apparatus 1 works a connection-destination selection control (CD selection control) (control associated with selection, addition and deletion of a connection-destination) for selecting a connection-destination through exchanging control messages with the first base station apparatus 2 as described later.

In the present embodiment, a user application section running in foreground is a user application section configured to determine the communication condition for the terminal apparatus 1. Alternatively, whether running in foreground or background, a user application section having a highest priority level may work the CD selection control. In this case, the priority level of each user application section may be set in advance by a user.

In other embodiments, a monitoring application section for monitoring one or more other user application sections is provided separately therefrom, and the monitoring application section may work the CD selection control; that is, the monitoring application section may monitor a user application section which is being used for communication to determine a connection-destination based on the type or operation status or other conditions of the monitored user application section.

In this case, the monitoring application section may monitor a user application section running in foreground. In one embodiment, the monitoring application section may monitor a user application section having a highest priority level where the priority level of each user application section is set in advance by the user. In another embodiment, the monitoring application section may monitor a user application section having a largest communication volume per a specific time period.

Figure 3:
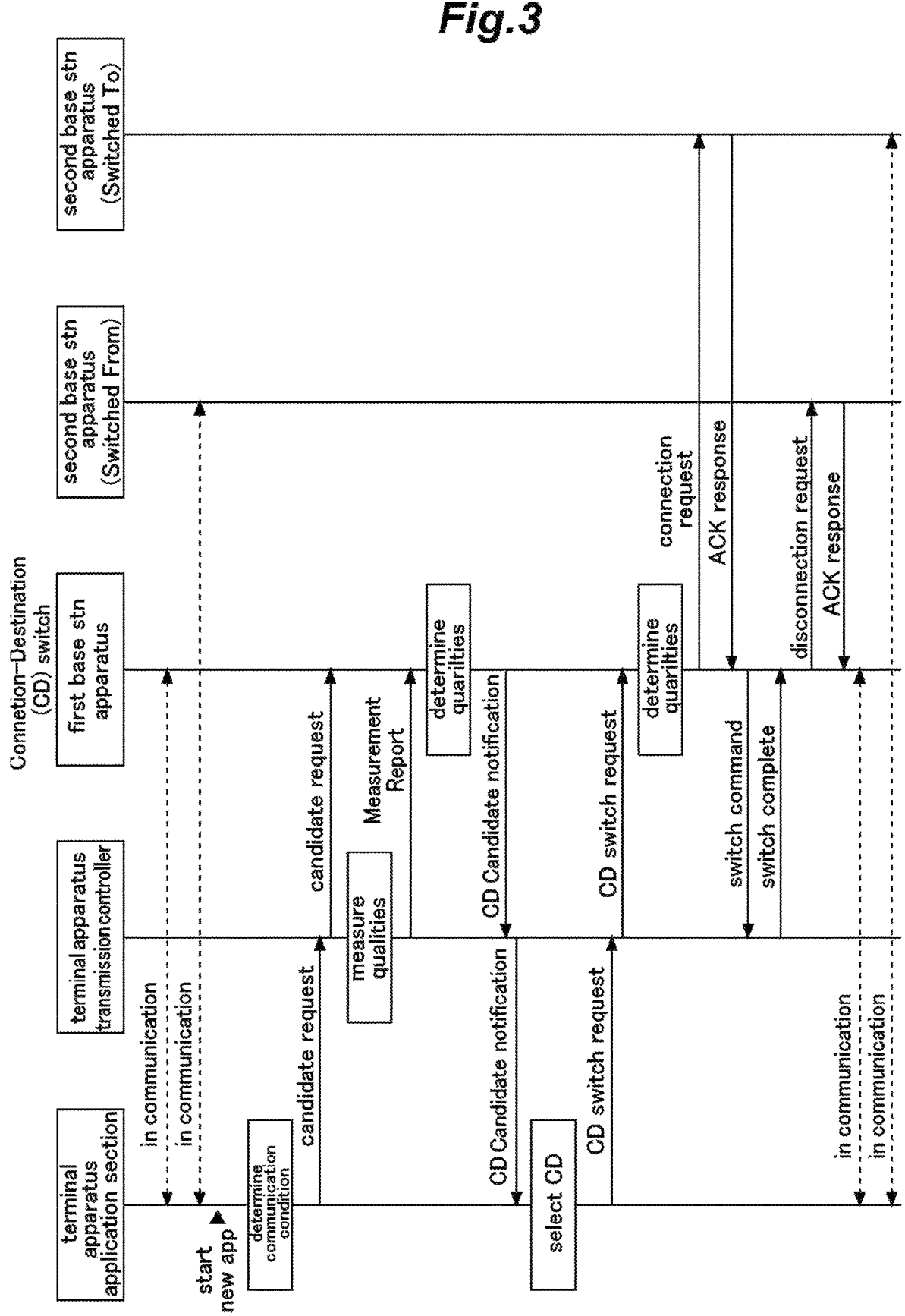
FIG. 3 is a sequence diagram showing a procedure for switching from one connection-destination to another.

Next, procedures for switching from one connection-destination to another will be described. FIG. 3 is a sequence diagram showing a procedure for switching from one connection-destination to another. With regard to the terminal apparatus 1, a user application section and the transmission controller are shown separately. As described above, the second base station apparatus 3 is a small cell base station and deployed in the communication area of the first base station apparatus 2 which is a macro cell base station. In an example shown in FIG. 3, the terminal apparatus 1 disconnects communication with the second base station apparatus 3 (connection-destination to be switched from) which the terminal apparatus 1 has been communicated with, and switches the connection-destination to another second base station apparatus 3 (connection-destination to be switched to).

In the terminal apparatus 1, a user application section which is already running is currently communicating with the first base station apparatus 2 and the second base station apparatus 3. When another new application section starts running, the (new) user application section determines whether or not a communication condition is met.

The communication-condition based determination process determines whether or not the second base station apparatus 3 currently being used for communication meets the communication condition required by the new user application section. When it is determined that the second base station apparatus 3 currently being used for communication does not meet the communication condition requested by the new user application section and that a connection-destination switching is necessary, the user application section transmits a connection-destination candidate request control message (CDC request control message) to the first base station apparatus 2 via the transmission controller. On the other hand, when it is determined that the second base station apparatus 3 currently being used for communication meets the communication condition requested by the new user application section and that a connection-destination switching is not necessary, the user application section does not transmit a CDC request control message to the first base station apparatus 2.

The CDC request control message requests the first base station apparatus 2 to provide the terminal apparatus with connection-destination candidate information (CDC information) on second base station apparatuses 3 (to be switched to) as connection-destination candidates (CDCs) connectable to the terminal apparatus 1 (connection-destination candidate list (CDC list)).

Specifically, the CDC request control message includes information on whether or not the CDC information is necessary, information on the use of the user application (massive broadband, mission critical, massive connection or the like), and information on the user type (human, automobile, robot, drone, ship, airplane, balloon, sensor or the like). The term "user" as used herein refers to a user subject of a user application(s) of the terminal apparatus 1, which means that the user application(s) may be used by a human in possession of the terminal apparatus 1, a sensor provided in the terminal apparatus 1, or a device equipped with the terminal apparatus 1. Information on the user type may be input in advance by a user or the like who is to use the terminal apparatus 1.

The transmission controller in the terminal apparatus 1 also measures wireless communication qualities associated with each of the detected second base station apparatuses 3 (in this case, both the base station apparatus to be switched from and the base station apparatus to be switched to), and transmits a measurement result report control message including wireless communication quality measurements (e.g. received power, signal-noise ratio) to the first base station apparatus 2.

Although, in the present embodiment, the terminal apparatus transmits the CDC request control message separated from the measurement result report control message, the terminal apparatus may transmit a measurement result report control message including the above described pieces of information included in the CDC request control message. The measurement result report control message may include all pieces of information associated with each of the detected second base station apparatuses 3. Alternatively, the terminal apparatus may transmit separate control messages each including a measurement result associated with a corresponding one of the detected second base station apparatuses 3.

Next, upon receiving the CDC request control message and the measurement result report control message transmitted from the terminal apparatus 1, the first base station apparatus 2 determines whether or not the communication quality requirements are met when using each second base station apparatuses 3 (in this case, both the base station apparatus to be switched from and the base station apparatus to be switched to), and generates CDC information on the second base station apparatuses 3 to be CDCs (CDC list). Then, the first base station apparatus transmits a connection-destination notification control message (CDC notification control message) including the generated CDC information to the terminal apparatus 1.

The CDC notification control message includes information on the respective second base station apparatus 3 such as RAT, Frequency, Cell ID, SSID, or the like of each second base station apparatus 3. Frequency is a frequency (frequencies) which can be used for communication with a second base station apparatus 3 in the CDC list. Cell ID and SSID are identifiers for identifying a second base station apparatus 3. It should be noted that RAT and Frequency may be omitted from the CDC notification control message.

Supplementary information which can be acquired only by the first base station apparatus 2 may be added to the CDC notification control message. More specifically, the information on CDCs may additionally include information on levels of congestion associated with communication between the terminal apparatus 1 and each of the second base station apparatuses 3. The information on the levels of congestion includes the number of active users (terminal apparatuses 1 currently connected though links defined by RRC (Radio Resource Control)), radio resource utility rate, or the like. The supplementary information may also include information on an MEC (Mobile Edge Computing) server connected to the second base station apparatus 3 listed in the CDCs. The information on an MEC server may include information as to whether or not the server offers content cache service, information on an RTT (round-trip time), and the like. Furthermore, predictive throughput values and location information for the second base station apparatuses 3 may be added to the CDC notification control message.

Next, upon receiving the CDC notification control message transmitted from the first base station apparatus 2 via the transmission controller, the user application section in the terminal apparatus 1 uses the CDC information included in the CDC notification control message to perform connection-destination selection processing (CD selection processing). Through performing the CD selection processing, the user application section selects the optimum connection-destination from the second base station apparatuses 3 listed as CDCs in the CDC information, and acquires the wireless communication quality measurements of the selected connection-destination. Then, the user application section transmits a connection-destination switch request control message (CD switch request control message) including the wireless communication quality measurements to the first base station apparatus 2 via the transmission controller.

The CD switch request control message requests to establish a connection to the selected connection-destination base station, and includes information on result of the CD selection processing. That is, the CD switch request control message includes identification information (such as RAT, Frequency, Cell ID, SSID, and the like) of the second base station apparatus 3 selected as the connection-destination and wireless communication quality measurements (e.g. received power, signal-noise ratio) which are resultant measurements of wireless communication qualities associated with the second base station apparatus 3. In some cases, RAT and/or Frequency may be omitted from the identification information.

Next, upon receiving the CD switch request control message transmitted from the terminal apparatus 1, the first base station apparatus 2 determines again whether or not the communication quality requirements are met when using the selected second base station apparatus 3. When the prescribed communication quality requirements are met, the first base station apparatus 2 determines that the second base station apparatus which the terminal apparatus 1 has selected as a connection-destination is a connection-destination to be used, and transmits a connection request control message to the second base station apparatus 3 (to be switched to). Upon receiving an acknowledgement response control message transmitted the second base station apparatus 3, the first base station apparatus 2 transmits a switch command control message to the terminal apparatus 1.

Upon receiving the switch command control message transmitted from the first base station apparatus 2, the transmission controller of the terminal apparatus 1 performs connection-destination switch processing (CD switch processing) and transmits a switch complete control message to the first base station apparatus 2. As a result, the terminal apparatus 1 establishes a connection to the selected the second base station apparatus 3 and the user application section running on the terminal apparatus 1 becomes possible to start performing communication with the second base station apparatus 3 selected as a connection-destination.

On the other hand, upon receiving the switch complete control message transmitted from the terminal apparatus 1, the first base station apparatus 2 transmits a disconnection request control message to the second base station apparatus 3 to be switched from. Upon receiving the disconnection request control message transmitted from the first base station apparatus 2, the second base station apparatus 3 to be switched from performs disconnection processing and transmits an acknowledgement response control message to the first base station apparatus 2. After the above described processing, the terminal apparatus 1 is used for communication with the first base station apparatus and the second base station apparatus 3 (which has been switched to).

Figure 4:
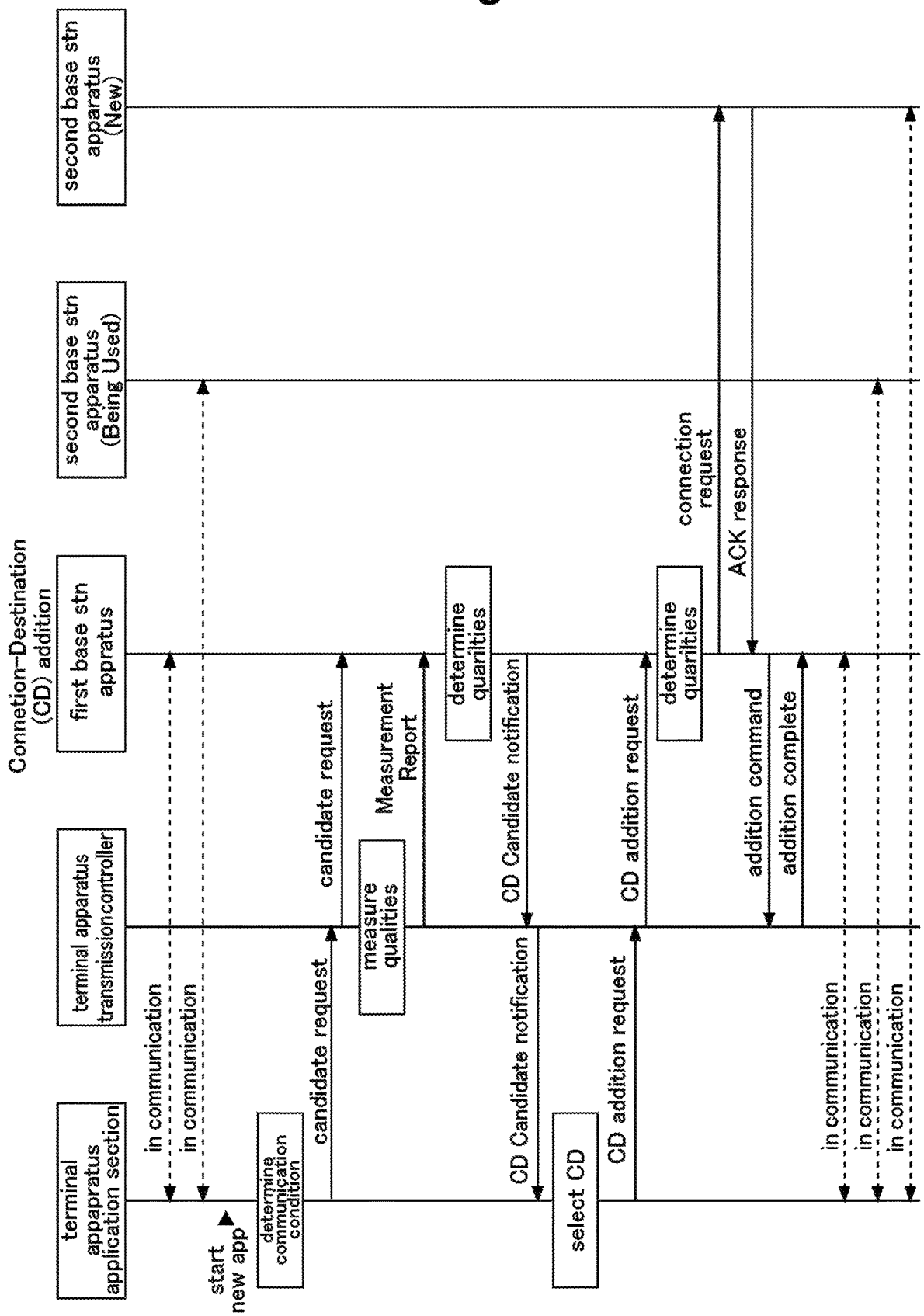
FIG. 4 is a sequence diagram showing a procedure for adding a connection-destination.

Next, procedures for adding a connection-destination(s) will be described. FIG. 4 is a sequence diagram showing a procedure for adding another connection-destination. In an example shown in FIG. 4, the terminal apparatus 1 has been communicating with the first base station apparatus 2 and the second base station apparatus 3, and adds another second base station apparatus 3 as a new connection-destination. In FIG. 4, the second base station apparatus 3 currently being used for communication is indicated as "Second Base Stn Apparatus (Being Used)" and the second base station apparatus 3 to be used as a new connection-destination is indicated as "Second Base Stn Apparatus (New)."

The procedure for adding a connection-destination(s) in FIG. 4 is similar to, but different from the procedure for switching from one connection-destination to another shown in FIG. 3 in that the procedure in FIG. 4 does not include exchanging control messages (disconnection request control message, acknowledgement response control message) with the second base station apparatus 3 with which the first base station apparatus is required to disconnect communication.

Moreover, in the procedure for adding a connection-destination(s) shown in FIG. 4, when it is determined in the communication-condition based determination that the second base station apparatus 3 currently being used for communication does not meet the communication condition required by a user application section although the user application needs the addition of a further connection-destination, the first base station apparatus transmits a CDC request control message.

In addition, the procedure for switching from one connection-destination to another in FIG. 3 involves exchanging control messages between the terminal apparatus 1 and the first base station apparatus 2. Such control messages include the CD switch request control message, the switch command control message, and the switch complete control message, whose counterparts in the procedure for adding a connection-destination(s) shown in FIG. 4 are a connection-destination addition request control message (CD addition request control message), an addition command control message, and an addition complete message, respectively. The CD addition request control message serves substantially the same function as the CD switch request control message.

Although, in the examples in FIGS. 3 and 4, the terminal apparatus starts to work the CD selection control when a new application section starts running, the terminal apparatus can start to work the CD selection control at various times. For example, the terminal apparatus may start to work the CD selection control when the terminal apparatus changes from a non-communication state to a communication state, when a user application section running in foreground is changed to that running in background, or when a user changes the priority level of a user application section. In other embodiments, a separate monitoring application section for monitoring a user application section(s) may be provided, and in this case, the terminal apparatus can start to work the CD selection control when a user application section to be monitored by the monitoring application section is changed.

When the terminal apparatus starts to work the CD selection control, the communication-condition based determination may be omitted from the procedure. For example, in the examples shown in FIGS. 3 and 4, when a new application section starts running, the terminal apparatus may transmit a CDC request control message to the first base station apparatus 2 without determining whether or not the communication condition is met.

Figure 5:
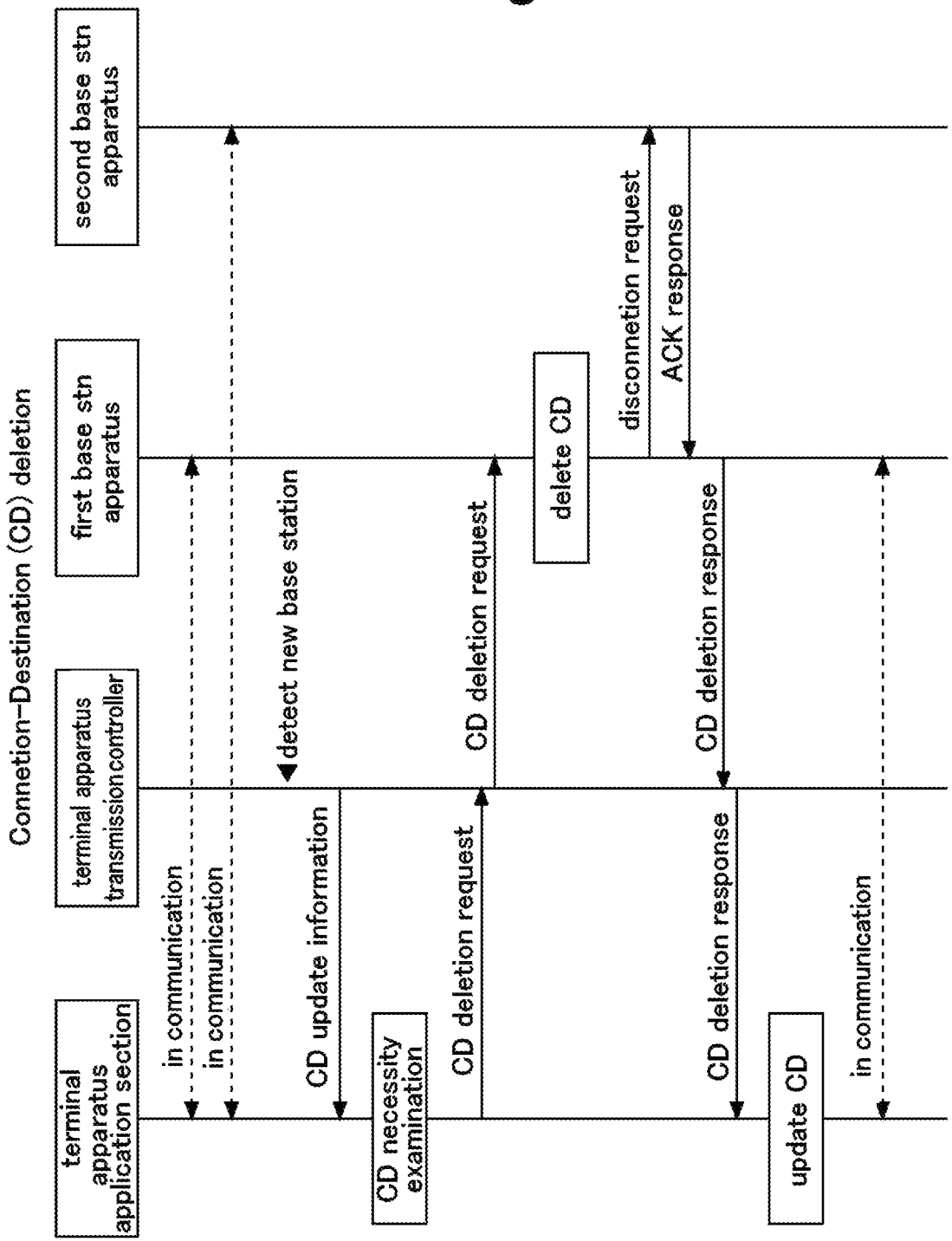
FIG. 5 is a sequence diagram showing a procedure for deleting a connection-destination.

Next, procedures for deleting a connection-destination(s) will be described. FIG. 5 is a sequence diagram showing a procedure for deleting a connection-destination. In an example shown in FIG. 5, the terminal apparatus disconnects communication with a second base station apparatus 3 which the terminal apparatus has been communicated with and deletes the second base station apparatus 3 from the connection-destinations to be used.

A user application section which is already running on the terminal apparatus 1 is currently communicating with a first base station apparatus 2 and the second base station apparatus 3. When the transmission controller in the terminal apparatus 1 detects a new second base station apparatus 3 which is different from the second base station apparatus 3 currently being used for communication, the terminal apparatus 1 completes the establishment of a connection to the new second base station apparatus 3 and then the transmission controller provides the user application section with connection-destination update information (CD update information).

Upon receiving the CD update information from the transmission controller, the user application section in the terminal apparatus 1 performs a necessity examination. The necessity examination involves determining whether or not an existing connection-destination(s) (base station apparatus currently being used for communication) is necessary based on the CD update information received from the transmission controller to make a necessary change, if any, in the connection-destination(s) to be used. In the necessity examination, when detected base station apparatus 2 to 4 include a more appropriate connection-destination(s) than an existing connection-destination, the user application section determines that the existing connection-destination(s) is unnecessary and to be deleted. Also, when an existing connection-destination(s) is determined to be unnecessary from the viewpoint of saving power consumption, the user application section determines that the existing connection-destination(s) is to be deleted. In these cases, the user application section transmits a connection-destination deletion request control message (CD deletion request control message) to the first base station apparatus 2 via the transmission controller.

The CD deletion request control message requests the first base station apparatus 2 to delete an existing connection-destination(s), and includes identification information (such as RAT, Frequency, Cell ID, SSID, and the like) of the second base station apparatuses to be deleted. In some cases, RAT and/or Frequency may be omitted from the identification information.

Upon receiving the CD deletion request control message transmitted by the terminal apparatus 1, the first base station apparatus 2 performs connection-destination deletion processing (CD deletion processing) and transmit a disconnection request control message to the second base station apparatus 3. Upon receiving the disconnection request control message transmitted by the first base station apparatus 2, the second base station apparatus 3 performs the disconnection processing and transmits an acknowledgement response control message to the first base station apparatus 2. Upon receiving the acknowledgement response control message transmitted by the second base station apparatus 3, the first base station apparatus 2 transmits a connection-destination deletion response control message (CD deletion response control message) to the terminal apparatus 1.

In the terminal apparatus 1, the user application section, upon receiving the CD deletion response control message transmitted by the first base station apparatus 2 via the transmission controller, performs connection-destination update processing (CD update processing). In the CD update processing, the connection-destination(s) to be deleted is removed from a connection-destination list (CD list) (connection-destination information (CD information)).

Although, in the example in FIG. 5, the user application section performs the necessity examination when a new second base station apparatus 3 is detected, the user application section may perform a necessity examination when another user application section stops running or when user application sections running in foreground and background are exchanged with each other.

Such CD deletion processing is performed to reconstruct the communication environment into one suitable for a new situation when communication conditions are changed such as when new base station apparatuses 2 to 4 become available, or when a use state of a user application section is changed such as when a user application section which has been running on the terminal apparatus stops running.

For example, a high SHF band line and an LTE line can be combined to implement a link aggregation such that the LTE line may be utilized to provide a backup line for the high SHF line. In this case, when a third base station apparatus 4 which supports WiGig (Registered Trademark) is detected, the existing LTE line becomes no longer necessary since a WiGig line is more appropriate for providing a backup line for the high SHF band line than the LTE line.

Under this condition, if the existing LTE line is not deleted as an unnecessary connection-destination, the terminal apparatus 1 becomes unable to utilize the third base station apparatus 4 which supports WiGig (Registered Trademark) in some cases such as when the first base station apparatus 2 (control plane based station) instructs the terminal apparatus to use the LTE line for communication.

Although, in the examples shown in FIGS. 3 to 5, the first base station apparatuses 2 and the second base station apparatuses 3 support RATs for mobile phones, the CD switch processing, CD addition processing, and CD selection processing can be performed on communication with the third base station apparatus 4 which supports a RAT other than RATs for mobile phones, such as wireless LAN.

In this way, various control messages are exchanged between the terminal apparatus 1 and the base station apparatuses 2 to 4, and according to these control messages, the CD switch processing, CD addition processing, and CD selection processing can be performed at any one of MAC (Media Access Control) layer, PDCP (Packet Data Convergence Protocol) layer, and TCP (Transmission Control Protocol) layer. Preferably, carrier aggregation technology is used at the MAC layer and Multipath TCP is used in the TCP layer. When the CD switch processing, CD addition processing, or CD selection processing is performed, the control messages are preferably exchanged at RRC (Radio Resource Control) layer.

Figure 6:
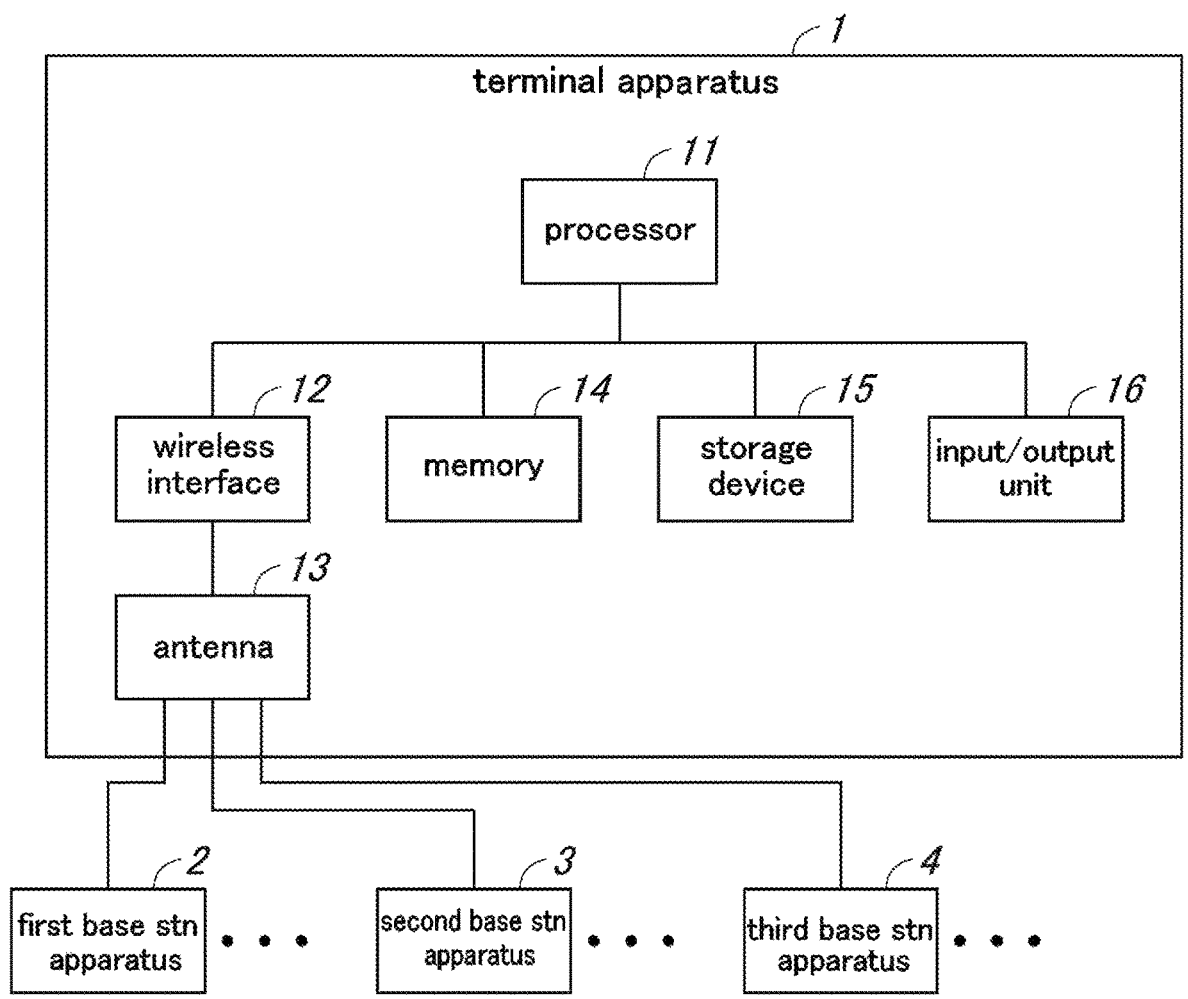
FIG. 6 is a block diagram showing a hardware configuration of the terminal apparatus 1.

Next, hardware configurations of the terminal apparatus 1 will be described. FIG. 6 is a block diagram showing a hardware configuration of the terminal apparatus 1.

The terminal apparatus 1 includes a processor (controller) 11, a wireless interface (communicator) 12, an antenna 13, a memory (working memory) 14, a storage device 15 such as a flash memory or a memory card, and an input/output unit 16. The storage device 15 stores programs executed by the processor 11 and other data. The input/output unit 16 is comprised primarily of a display, a speaker, operation keys, and other user-interfaces.

Figure 7:
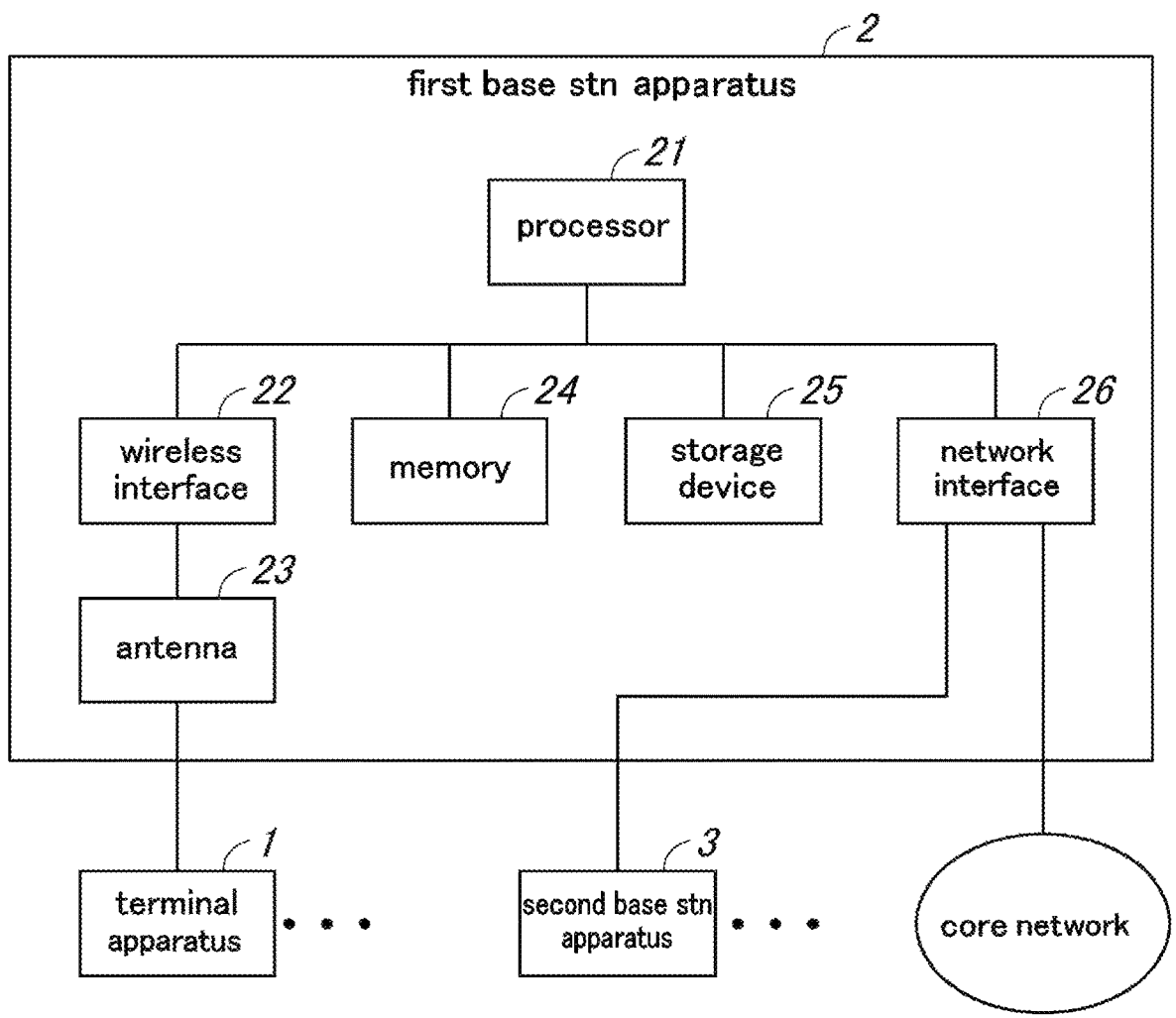
FIG. 7 is a block diagram showing a hardware configuration of the first base station apparatus 2.

Next, hardware configurations of the first base station apparatus 2 will be described. FIG. 7 is a block diagram showing a hardware configuration of the first base station apparatus 2.

The first base station apparatus 2 includes a processor (controller) 21, a wireless interface 22, an antenna 23, a memory (working memory) 24, a storage device 25 such as a HDD (Hard Disk Device), and a network interface 26.

The storage device 25 stores programs executed by the processor 21 and other data. The wireless interface 22 and the antenna 23 are used to perform wireless communication with the terminal apparatus 1. The network interface 26 communicates with the second base station apparatuses 3 and the core-network.

The second base station apparatus 3 and the third base station apparatus 4 have the same hardware configuration as the first base station apparatus 2.

Figure 8:
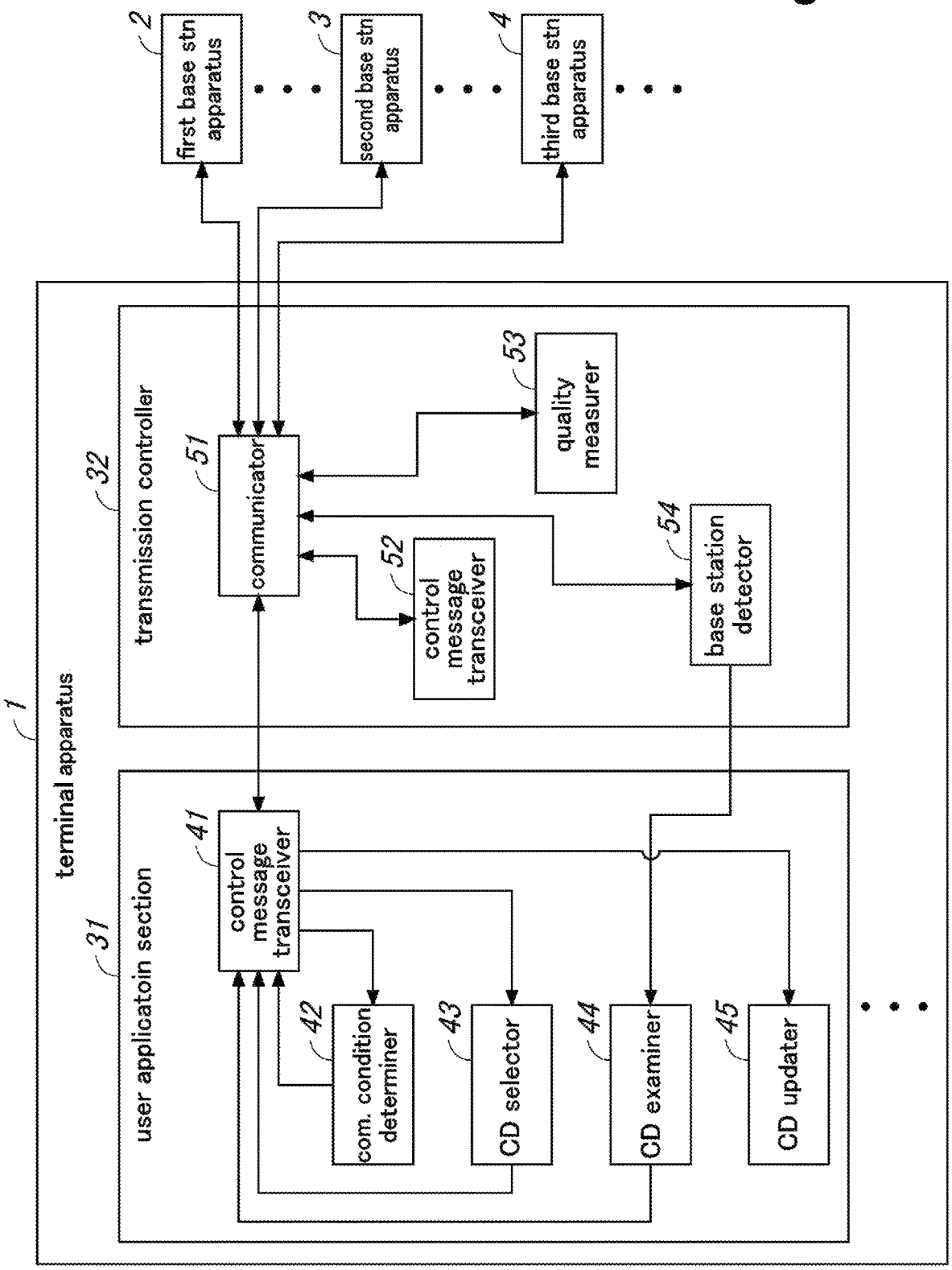
FIG. 8 is a functional block diagram of the terminal apparatus 1.

Next, a functional configuration of the terminal apparatus 1 will be described. FIG. 8 is a functional block diagram of the terminal apparatus 1.

The terminal apparatus 1 includes a user application section 31 and a transmission controller 32.

The transmission controller 32 includes a communicator 51, a control message transceiver 52, a quality measurer 53, and a base station detector 54. The communicator 51 is primarily comprised of the wireless interface 12 and the antenna 13 (see FIG. 6). The control message transceiver 52, the quality measurer 53 and the base station detector 54 are implemented by causing the processor 11 to execute a transmission control program stored in the storage device 15 (see FIG. 6).

The communicator 51 communicates with the base station apparatuses 2 to 4.

The control message transceiver 52 transmits and receives control messages (such as measurement result report, switch command control message, switch complete control message, addition command control message, and addition complete control message) to and from the base station apparatuses 2 to 4 via the communicator 51.

The quality measurer 53 measures wireless communication qualities associated with each of the second base station apparatuses 2 to 4 to acquire communication quality measurements (e.g. received power, signal-noise ratio).

The base station detector 54 detects the base station apparatuses 2 to 4 forming a coverage area within which the terminal apparatus is located such that the base station apparatuses 2 to 4 are available to the terminal apparatus, and outputs CD update information on the base station apparatuses 2 to 4 forming the coverage area within which the terminal apparatus is located and can communicate with the base station apparatuses 2 to 4.

The user application section 31 includes a control message transceiver 41, a communication condition determiner 42 (CD determiner 42), a connection-destination selector 43 (CD selector 43), a connection-destination examiner 44 (CD examiner 44), and a connection-destination updater 45 (CD updater 45). The user application section 31 is implemented by causing the processor 11 to execute an application program stored in the storage device 15 (see FIG. 6).

The control message transceiver 41 transmits and receives control messages (such as CDC request control message, CDC notification control message, CD switch request control message, CD addition request control message, CD deletion request control message) to and from the base station apparatuses 2 to 4 via the communicator 51.

The communication condition determiner 42 determines whether the base station apparatuses 2 to 4 currently being used for communication meet a communication condition required by the user application section 31. When the base station apparatuses 2 to 4 currently being used for communication do not meet the communication condition required by the user application section 31, the communication condition determiner determines that performing the CD switch processing or CD addition processing is necessary, and the control message transceiver 41 generates a CDC request control message and transmits the CDC request control message to the base station apparatuses 2 to 4 via the communicator 51.

For example, when the user application section 31 is for voice communication, the required communication condition is a large radius of cell, which brings about a low switching frequency even at low communication speed, leading to the reduction of discontinuities and short breaks of voice. When the user application section 31 is for video viewing (VOD: Video On Demand), the required communication condition is a high communication speed, which brings about a decreased downloading time.

In cases where the user application section 31 is an in-vehicle application for controlling a vehicle, which involves automatic operation control such as braking and steering, the required communication condition when a vehicle is travelling is a short delay, which ensures safety for driving. On the other hand, when a vehicle is parked, the required communication condition is a high communication speed, which enables real-time transmission of videos data to show crime scenes such as theft of items left in the vehicle.

In cases where the user application section 31 is a surveillance camera application for controlling surveillance cameras, since such a surveillance camera application has to stably and continuously notify a user that there is no abnormality such as an accident or a crime, the required communication condition is excellent in a long-term stability when no abnormality is detected. On the other hand, when an abnormality is detected, the required communication condition is a high communication speed, which enables real-time transmission of videos data to show crime scenes.

The communication condition determiner 42 determines whether or not the communication condition is met when the terminal apparatus 1 transits from a non-communication state to a communication state and/or when the user application section 31 whose communication condition is defined as the communication condition is changed to another user application section.

When the user application section 31 whose communication condition is defined as the communication condition is changed to another user application section such as when a user application section running in foreground is changed to be running in background or when a user changes the priority level of a user application section, the terminal apparatus may start to work the CD selection control. In other embodiments, a monitoring application section for monitoring one or more user application sections may be provided separate from the user application section 31, and in this case, the terminal apparatus can start to work the CD selection control when a change is made in a user application section to be monitored by the monitoring application section.

The CD selector 43 selects a connection-destination(s) based on CDC information included in a CDC notification control message acquired from the base station apparatus 2 to 4 and connection-destination selection policy specified by a user or an application program. When the CD selector 43 selects a connection-destination(s), the control message transceiver 41 generates a CD addition request control message or a CD switch request control message and transmits the CD addition request control message or CD switch request control message to the base station apparatus 2 to 4 via the communicator 51.

The CD selector 43 selects a connection-destination(s) based on the type and state of the user application section 31, the type and state of the user (user subject) using the user application section 31, the state of the terminal apparatus 1 or the like. The type of the user application section 31 is determined by whether or not the user application section 31 downloads data and/or whether the user application section 31 is for real-time systems (voice or video) or for non-real-time systems. The state of the user application section 31 is determined by the remaining transmission volume and/or whether the user application section 31 runs in foreground or background. The type of a user is, for example, a human, a robot, a car, a ship, an airplane, a balloon, a drone, or a sensor. The state of a user is determined by a movement speed, a location, a degree of risk (e.g. in the vicinity of an intersection or the like), and other conditions. The state of the terminal apparatus 1 is, for example, a remaining batter charge and/or a heating value.

The CD examiner 44, based on the CD update information received from the base station detector 54, determines that an existing connection-destination(s) (base station(s) apparatus currently being used for communication) is unnecessary and to be deleted when detected base station apparatus 2 to 4 include a more appropriate connection-destination(s) than the existing connection-destination. Also, the CD examiner determines that an existing connection-destination(s) is to be deleted when the existing connection-destination(s) is determined to be unnecessary from the viewpoint of saving power consumption. When the existing connection-destination is determined to be deleted, the control message transceiver 41 generates a CD deletion request control message and transmits the CD deletion request control message to the base station apparatus 2 to 4 via the communicator 51.

The CD updater 45 performs CD update processing by removing the deleted connection-destination from a CD list (or CD information) and registering the added connection-destination to the CD list.

In the present embodiment, when the user application section 31 detects that the user application section 31 itself is running in foreground, each part of the user application section 31 performs the above described processing.

In cases where a necessity examination is made when a user application section stops running, a supervising application section is preferably provided separate from the user application section. In this case the supervising application section includes the CD examiner 44 and the CD updater 45.

Figure 9:
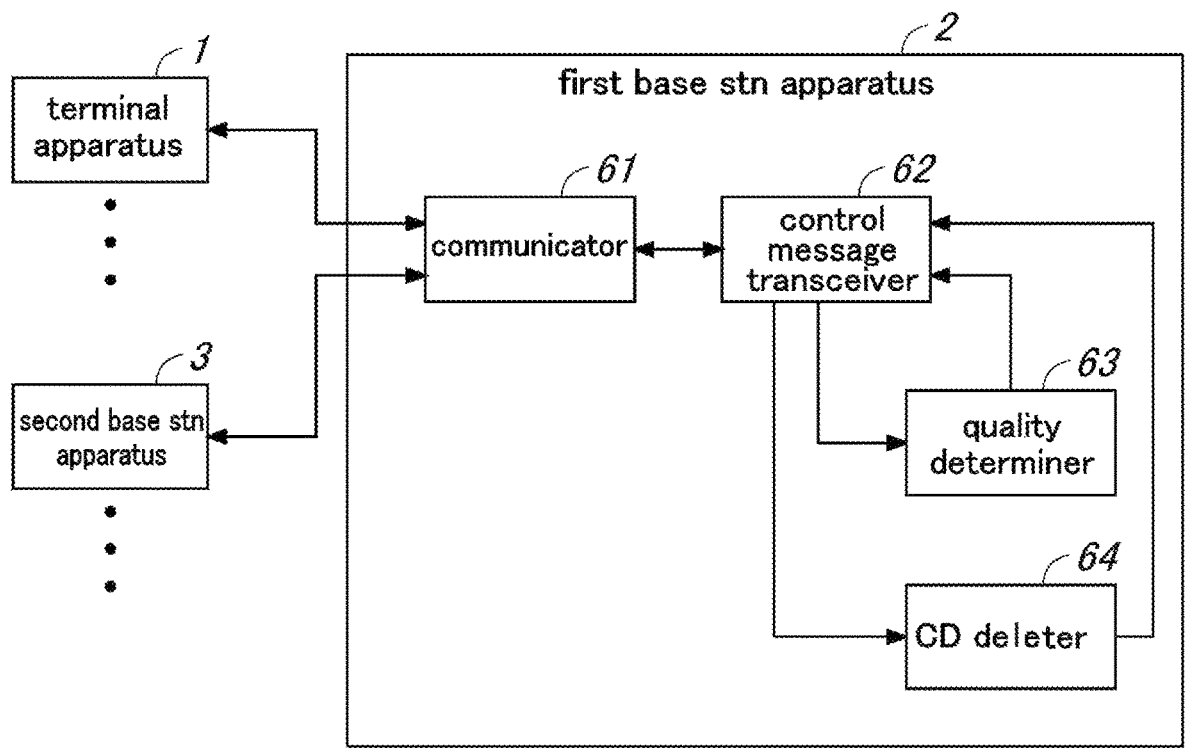
FIG. 9 is a functional block diagram of the first base station apparatus 2.

Next, a functional configuration of a first base station apparatus 2 will be described. FIG. 9 is a functional block diagram of the first base station apparatus 2.

The first base station apparatus 2 includes a communicator 61, a control message transceiver 62, a quality determiner 63, and a connection-destination deleter (CD deleter) 64. The communicator 61 is comprised primarily of the wireless interface 22, the antenna 23, and the network interface 26 (see FIG. 7). The control message transceiver 62, the quality determiner 63, and the CD deleter 64 are implemented by causing the processor 21 (see FIG. 7) to execute a transmission control program stored in the storage device 25.

The communicator 61 communicates with the terminal apparatus 1 and the second base station apparatuses 3.

The control message transceiver 62 exchanges control messages with the terminal apparatus 1 and the second base station apparatus 3. Specifically, the control message transceiver 62 receives a CDC request control message, a measurement result report control message, a CD switch request control message, a CD addition request control message, a switch complete control message, an addition complete control message, a CD deletion request control message transmitted from terminal apparatus 1, and transmits a CDC notification control message, a switch command control message, an addition command control message, a CD deletion response control message to the terminal apparatus 1. The control message transceiver also transmits a connection request control message and a disconnection request control message to the second base station apparatus 3, and receives an acknowledgement response control message transmitted from the second base station apparatus 3.

Upon receiving the CDC request control message and the measurement result report control message transmitted from the terminal apparatus 1 at the control message transceiver, the quality determiner 63 determines whether or not the communication quality requirements are met when using the second base station apparatus 3 based on communication quality information on the second base station apparatuses 3 included in the measurement result report control message and information on the second base station apparatus 3 collected by the quality determiner itself, and then the quality determiner 63 generates CDC information on the second base station apparatuses 3 as CDCs connectable to the terminal apparatus 1 (CDC list). When the quality determiner 63 generates the CDC information, the control message transceiver 62 generates a CDC notification control message including the CDC information, and transmits the generated CDC notification control message to the terminal apparatus 1.

When the control message transceiver 62 receives the CD switch request control message or the CD addition request control message transmitted from the terminal apparatus 1, the connection-destination deleter 64 performs CD deletion processing.

Nest, processing performed by the connection-destination selector 43 of the terminal apparatus 1 will be described. FIG. 10 is a flow diagram showing an example of processing performed by the connection-destination selector 43 of the terminal apparatus 1.

As a high SHF band cell (first base station apparatus 2) is capable of high-speed communication (10 Gbps or more), the high SHF band cell is suitably used for downloading and/or generating a high communication volume. When a user of an application is a sensor system, which incurs a small communication volume, it is not necessary to select the high SHF band cell. In addition, the high SHF band cell covers only a small communication area. Thus, the high SHF band cell is not suitable for cases where the terminal apparatus 1 moves at high movement speeds and thus passes through a communication area in a short time period. Since the high SHF band cell has a high power consumption for several reasons such as the use of a high frequency circuit and the simultaneous use of a backup connection necessitated by its susceptibility to shielding which causes frequent interceptions, the high SHF band cell is not appropriate when the remaining batter charge is low.

Thus, in the present embodiment, the CD selector 43 of the terminal apparatus 1 sequentially performs the connection-determination selection procedure (CD selection procedure) including: determining whether or not the application is a type of application which downloads data (ST 101); determining whether or not the remaining communication volume of the application exceeds a prescribed threshold (ST 102); determining whether or not the user of the application is a human (ST 103); determining whether or not the movement speed of the terminal apparatus 1 is lower than a prescribed threshold value (ST 104); and determining whether or not the remaining battery charge level of the terminal apparatus 1 exceeds a prescribed threshold value (ST 105).

If the application is a type of application which downloads data (Yes at ST 101), the remaining communication volume of the application exceeds a prescribed threshold (Yes at ST 102), the user of the application is a human (Yes at ST 103), the movement speed of the terminal apparatus 1 is lower than a prescribed threshold value (Yes at ST 104), and the remaining battery charge level of the terminal apparatus 1 exceeds a prescribed threshold value (Yes at ST 105), the high SHF band cell is selected (ST 106), and otherwise (No at ST 101 to ST 105), a cell supporting another RAT (e.g. an LTE second base station apparatus 3) is selected (ST 107) as a connection-destination.

Note that the CD selection procedure is not limited to the one described above, and various other procedures may be adopted.

While specific embodiments of the present invention are described herein for illustrative purposes, the present invention is not limited thereto. It will be understood that various changes, substitutions, additions, and omissions may be made for elements of the embodiments without departing from the scope of the invention. In addition, elements and features of the different embodiments may be combined with each other as appropriate to yield an embodiment which is within the scope of the present invention.

INDUSTRIAL APPLICABILITY

A terminal apparatus, a communication system, and a connection-destination selection method according to the present invention enable selection of a connection-destination suitable for an application when switching a connection-destination to another, or adding or deleting a connection-destination, and are useful as a terminal apparatus configured to select a base station apparatus to be used as a connection-destination from a plurality of base station apparatuses and perform wireless communication with the base station apparatus; a communication system comprising a terminal apparatus and a plurality of base station apparatuses, wherein the terminal apparatus is configured to select a base station apparatus to be used as a connection-destination from the plurality of base station apparatuses, and perform wireless communication with the selected base station apparatus; and a connection-destination selection method for selecting a base station apparatus to be used as a connection-destination from a plurality of base station apparatuses.

Glossary 1 terminal apparatus
2 first base station apparatus 3 second base station apparatus
4 third base station apparatus
11 processor (controller)
21 processor (controller)
31 user application section
32 transmission controller
41 control message transceiver
42 communication condition determiner (CD determiner)
43 connection-destination selector (CD selector)
44 connection-destination examiner (CD examiner)
45 connection-destination updater (CD updater)
51 communicator
52 control message transceiver
53 quality measurer
54 base station detector
61 communicator
62 control message transceiver
63 quality determiner
64 connection-destination deleter (CD deleter)

The invention claimed is:

1. A terminal apparatus configured to select a base station apparatus to be used as a connection-destination from a plurality of base station apparatuses and perform wireless communication with the selected base station apparatus, comprising:
   a communication device performing wireless communication with one or more of the plurality of the base station apparatuses; and
   a controller comprising a processor performing information processing required by a user concurrently with performing wireless communication via the communication device with the one or more of the plurality of base station apparatuses,
   wherein the communication device is configured to receive a connection-destination candidate notification control message (CDC notification control message) transmitted from the one or more of the plurality of base station apparatuses, the CDC notification control message including connection-destination candidate information (CDC information) on the plurality of base station apparatuses as connection-destination candidates (CDCs) connectable to the terminal apparatus,
   wherein the controller is configured to select a new base station apparatus to be used as a new connection-destination based on a communication condition required by the processor and the CDC information,
   wherein the communication device is configured to transmit a connection-destination candidate request control message (CDC request control message) to the one or more of the plurality of base station apparatuses wherein the CDC request control message is configured to request the one or more of the plurality of base station apparatuses to provide the CDC information to the terminal apparatus, and the communication device is further configured to receive the CDC notification control message transmitted from the one or more of the plurality of base station apparatuses in response to the CDC request control message,
   wherein the controller is configured to determine whether or not the base station apparatus currently being used for communication meets the communication condition required by the processor,
   wherein the communication device is configured not to transmit the CDC request control message to the one or more of the plurality of base station apparatuses when the controller determines that the one or more of the plurality of base station apparatuses meets the communication condition, and
   wherein the controller is configured to determine whether or not the base station apparatus currently being used for communication meets the communication condition when the terminal apparatus transits from a non-communication state to a communication state or when the information processing performed by the processor whose communication condition is defined as the communication condition is changed to another information processing operation.

2. A terminal apparatus configured to select a base station apparatus to be used as a connection-destination from a plurality of base station apparatuses and perform wireless communication with the selected base station apparatus, comprising:
   a communication device performing wireless communication with one or more of the plurality of the base station apparatuses; and
   a controller comprising a processor performing information processing required by a user concurrently with performing wireless communication via the communication device with the one or more of the plurality of base station apparatuses,
   wherein the communication device is configured to receive a connection-destination candidate notification control message (CDC notification control message) transmitted from the one or more of the plurality of a base station apparatuses, the CDC notification control message including connection-destination candidate information (CDC information) on the plurality of base station apparatuses as connection-destination candidates (CDCs) connectable to the terminal apparatus,
   wherein the controller is configured to select a new base station apparatus to be used as a new connection-destination based on a communication condition required by the processor and the CDC information,
   wherein the communication device is configured to transmit a connection-destination switch request control message (CD switch request control message) to the one or more of the plurality of base station apparatuses when the connection destination is switched from the base station apparatus currently being used for communication to the new connection-destination, the CD switch request control message including identification information on the new base station apparatus selected by the controller as the new connection-destination, and
   wherein the communication device is configured to add information on results of measurements of wireless communication qualities associated with the new base station apparatus selected by the controller as the new connection-destination to the CD switch request control message or the CD addition request control message, and transmit the CD switch request control message or the CD addition request control message with the added information on results of measurements to the one or more of the plurality of base station apparatuses.

3. A terminal apparatus configured to select a base station apparatus to be used as a connection-destination from a plurality of base station apparatuses and perform wireless communication with the selected base station apparatus, comprising:

a communication device performing wireless communication with one or more of the plurality of the base station apparatuses; and a controller comprising a processor performing information processing required by a user concurrently with performing wireless communication via the communication device with the one or more of the plurality of base station apparatuses, wherein the communication device is configured to receive a connection-destination candidate notification control message (CDC notification control message) transmitted from the one or more of the plurality of base station apparatuses, the CDC notification control message including connection-destination candidate information (CDC information) on the plurality of base station apparatuses as connection-destination candidates (CDCs) connectable to the terminal apparatus, wherein the controller is configured to select a new base station apparatus to be used as a new connection-destination based on a communication condition required by the processor and the CDC information, wherein the controller is configured to make a necessity examination of the base station apparatus currently being used for communication to determine whether or not the base station apparatus currently being used is necessary as a connection-destination, and is configured to decide to delete the base station apparatus currently being used from the base station apparatuses to be used as connection-destinations when the controller determines that the base station apparatus currently being used is not necessary, and wherein the communication device is configured to transmit a connection-destination deletion request control message (CD deletion request control message) to the base station apparatus currently being used, the CD deletion request control message including identification information on the base station apparatus which the controller has decided to delete.

4. The terminal apparatus according to claim 3, wherein the controller is configured to make the necessity examination of the base station apparatus currently being used when the information processing performed by the processor whose communication condition is defined as the communication condition stops running or when a base station apparatus is newly detected.

* * * * *